United States Patent [19]

Trail, Jr.

[11] Patent Number: 4,561,580
[45] Date of Patent: Dec. 31, 1985

[54] APPARATUS FOR MEASURING THE TENSION IN AN ENDLESS ELONGATE MEMBER

[75] Inventor: George C. Trail, Jr., Matthews, N.C.

[73] Assignee: Celanese Corporation, New York, N.Y.

[21] Appl. No.: 643,335

[22] Filed: Aug. 22, 1984

[51] Int. Cl.⁴ .................. B65H 23/22; G01F 1/34
[52] U.S. Cl. ............................ 226/45; 73/862.39; 73/862.48
[58] Field of Search .............. 226/39, 44, 42, 45; 242/45; 73/862.39, 862.42, 862.48, 862.65

[56] References Cited

U.S. PATENT DOCUMENTS

| | | | |
|---|---|---|---|
| 2,340,067 | 1/1944 | Lessmann | 73/862.48 |
| 3,366,299 | 1/1968 | Rose, Jr. et al. | 226/44 |
| 3,558,026 | 1/1971 | Rosen | 226/39 |
| 3,667,664 | 6/1972 | Schroeder | 226/30 |
| 3,994,445 | 11/1976 | Tarulli | 242/45 |
| 4,233,837 | 11/1980 | Canfield | 73/862.48 |
| 4,433,586 | 2/1984 | Ohrnell et al. | 73/862.48 |

OTHER PUBLICATIONS

Publication entitled "Strain Gage Techniques" presented at the Department of Engineering, University of California, Aug. 18–29, 1958, William M. Murray et al.

Primary Examiner—Leonard D. Christian
Attorney, Agent, or Firm—S. M. Bodenheimer, Jr.

[57] ABSTRACT

A tension measuring apparatus measures the tension in a tow band being advanced under tension. The apparatus includes a sensing roll which is carried by a pair of torsion bars which carry strain gages. The apparatus occupies little space while defining relatively long moment arms for the torsion bars, so as to be highly sensitive, yet compact in design. The sensing roll can be swung between operative and inoperative positions.

11 Claims, 7 Drawing Figures

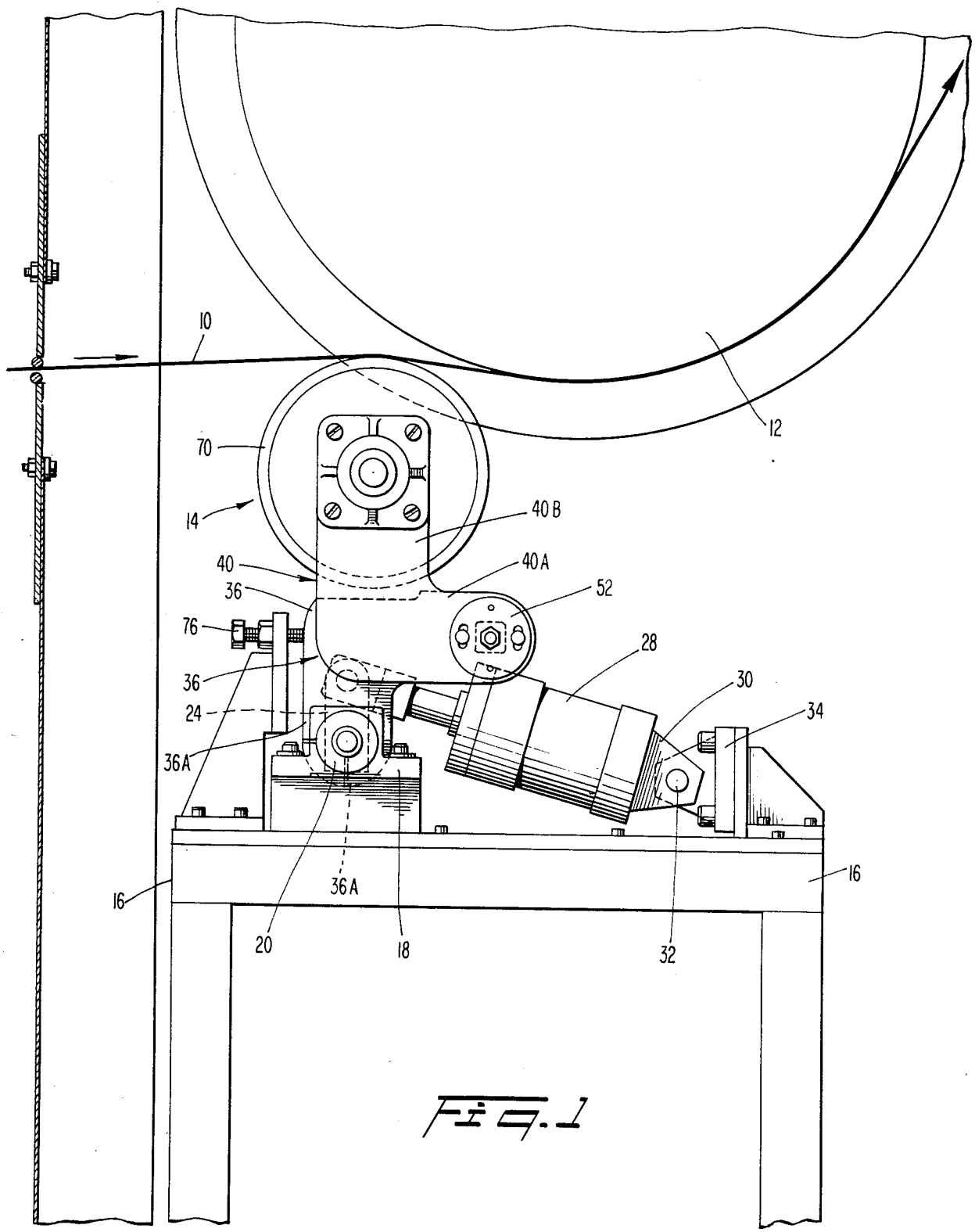

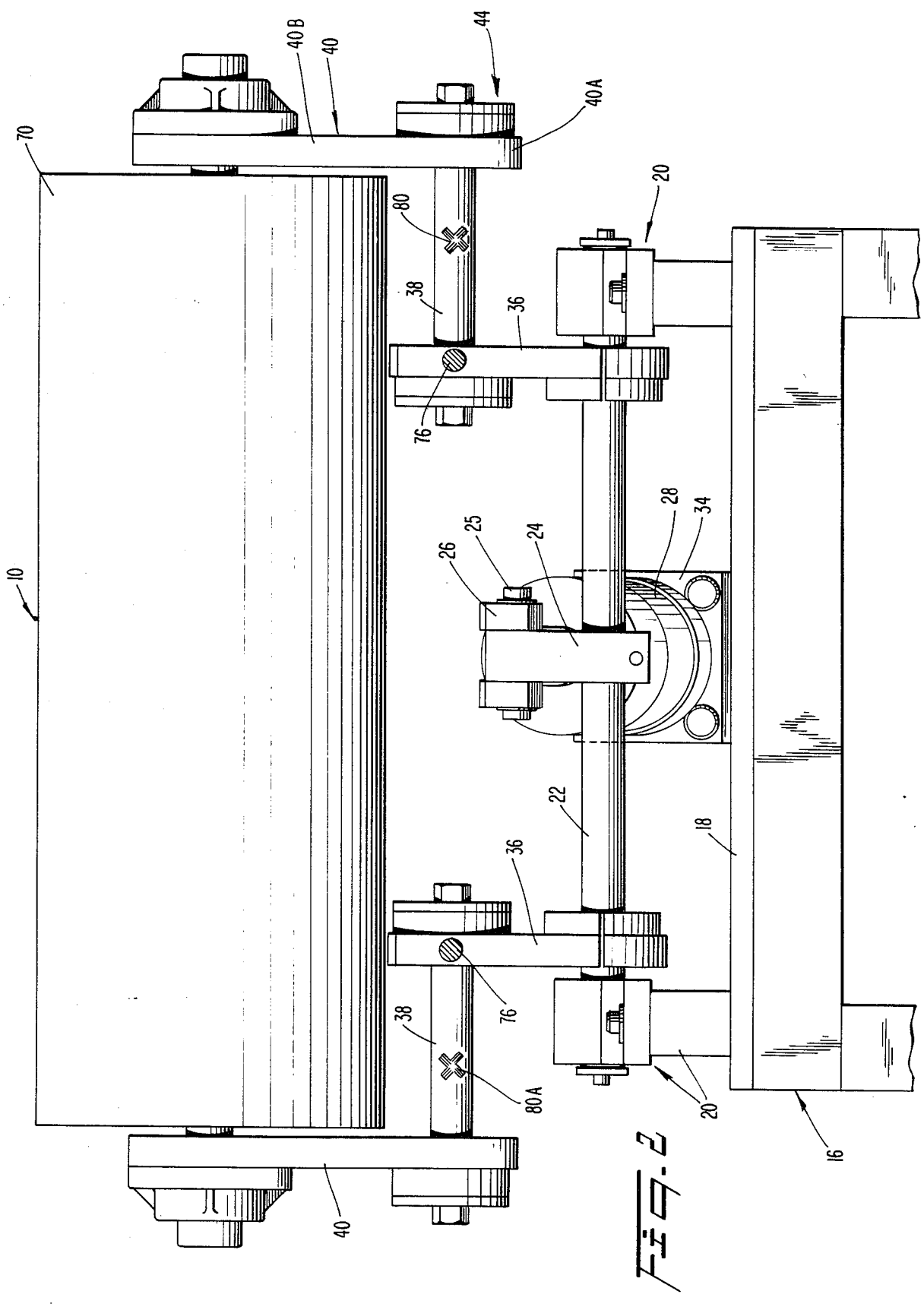

APPARATUS FOR MEASURING THE TENSION IN AN ENDLESS ELONGATE MEMBER

BACKGROUND AND OBJECTS OF THE INVENTION

The present invention relates to the measurement of tension in filamentary material and, in particular, to the measurement of staple tow tension on a staple drawframe.

In the manufacture of synthetic filamentary material such as yarn, filaments are drawn from a die and combined to form the yarn, or tow, which may then be conducted to various treatment zones on a drawframe. As the tow is being conducted, it is important that the degree of tension which is imposed upon the yarn lie within a certain acceptable range. Devices for measuring tow tension have been heretofore proposed and typically involve a roll or the like which is maintained in engagement with the traveling tow to deflect the tow from what would otherwise be its normal path of travel. In so doing, a reaction force is transmitted from the tow to the roll. As the tension imposed on the tow varies, the roll will be displaced, the extent of which is measured by a suitable measuring instrument. That measurement enables the tension on the tow to be determined.

The roll is usually attached to the end of a moment arm, the latter being deflected by the roll displacement to enable measurements to be made. In practice, however, the amount of deflection of the arm may vary, depending upon the location of the yarn on the roll. That is, as the yarn shifts along the roll during travel (a common occurrence), the measurements may vary. Thus, the known measuring devices are inconsistent and prone to error.

Also, the measuring devices used in connection with so-called "jumbo" drawframes which handle high denier tow, require that large, heavy rolls be employed. The weight of such rolls is so great that distortions in measurements can result, especially if long torsion bars are employed which perform sensing as well as roll-support functions.

Furthermore, known measuring devices are generally rather large in size, making it difficult to retrofit existing drawframes wherein space is at a premium. Thus, the making of tow tension measurements on such existing drawframes may be rendered impacticable for that reason.

It is, therefore, an object of the present invention to minimize or obviate problems and shortcomings of the above discussed sort.

Another object is to provide an improved tow tension measuring apparatus which is highly accurate and insensitive to shifting of the path of travel of the tow.

A further object is to provide such a device which occupies little space so as to be capable of being retrofit onto existing drawframes.

SUMMARY OF THE INVENTION

These objects are achieved by the present invention which relates to a tension measuring apparatus for the measuring of tension in an elongate member which is being advanced under tension. The apparatus is of the type comprising a sensor support carrying a rotatable sensing roll. An actuator moves the sensor support to bring the sensing roll into engagement with the elongate member such that the elongate member applies a reaction force against the sensing roll. A torsion bar is operably connected to the sensing roll to be torsionally deformed thereby in response to the application of the reaction force against the sensing roll. Strain gages are disposed on the torsion bar to measure the extent of torsional deformation thereof. The sensor support comprises a carrier supported so as to be moved by the actuating means. The carrier includes a pair of arm portions spaced apart in a direction parallel to an axis of rotation of the sensing roll. The arm portions have inner ends and extend from the inner ends transversely relative to the direction of the reaction force. The torsion bar is fixedly connected to outer ends of the arm portions and extends therefrom generally parallel to the axis of rotation of the sensing roll. A pair of torque members include sections having inner ends fixedly connected to the torsion bar and extending therefrom generally parallel to the arm portions toward the inner ends of the latter. The sensing roll is carried by outer ends of the torque members. The torque members define moment arms for applying a torquing force to the torsion bar in response to the application of the reaction force to the sensing roll, whereby the torsion bars are torsionally deformed and the extent of such deformation is sensed by the strain gages.

Preferably, there are provided a pair of torsion bars, each being fixedly connected between one of the arm sections and one of the torque members.

THE DRAWING

The objects and advantages of the invention will become apparent from the following detailed description of a preferred embodiment thereof in connection with the accompanying drawings, in which like numerals designate like elements, and in which:

FIG. 2 is a front elevational view of the apparatus depicted in FIG. 1;

FIG. 7 depicts an electrical circuit which may be employed to transfer signals from strain gages to a transducer.

DETAILED DESCRIPTION OF A PREFERRED EMBODIMENT OF THE INVENTION

Figure 1:
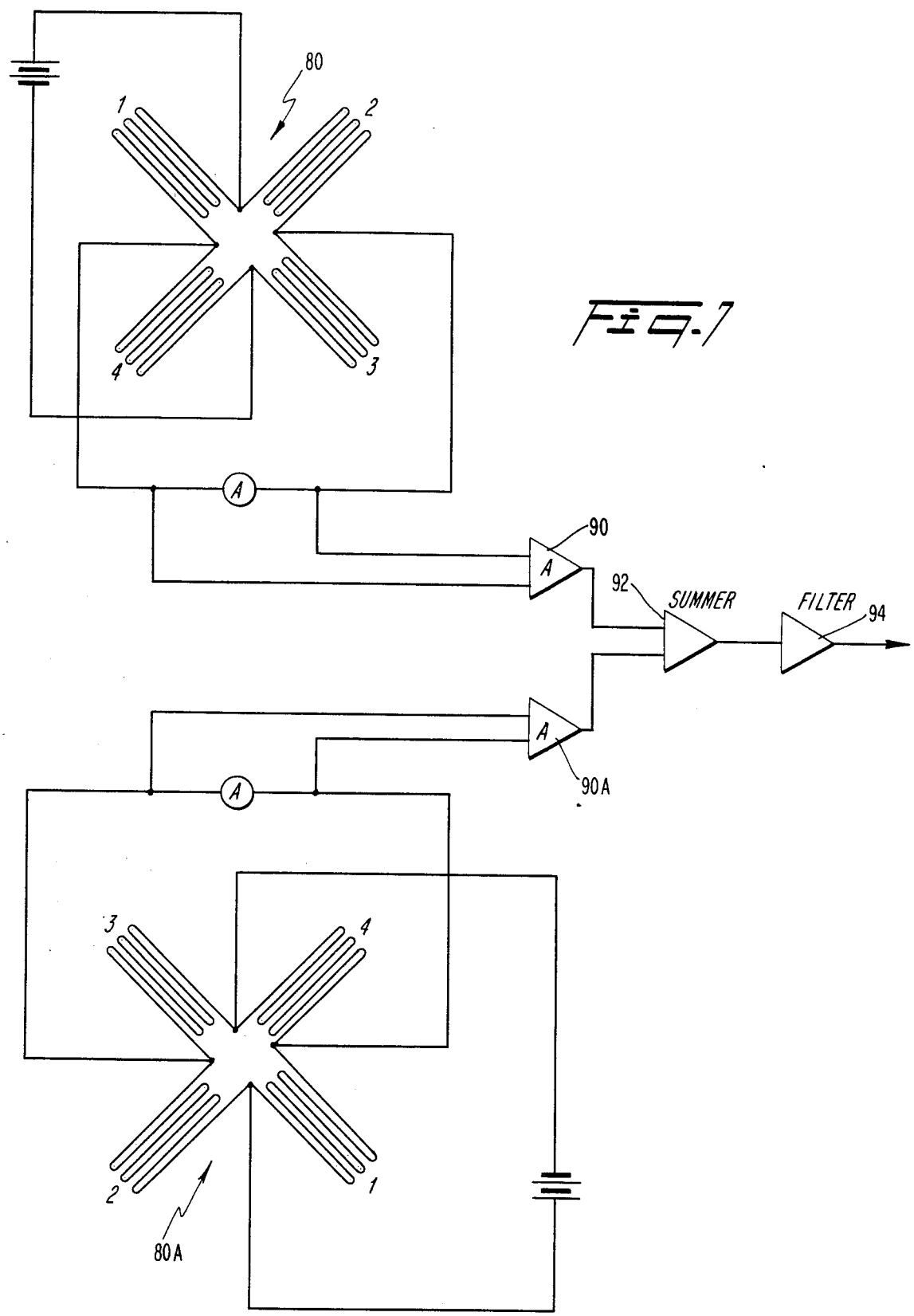
FIG. 1 is a side elevational view of a tension measuring apparatus according to the present invention as it measures the tension on a traveling tow band.

Depicted in FIG. 1 is a band of filamentary tow 10 formed of, for example, a synthetic yarn, which is being drawn upon a drawframe. The drawframe is standard and includes a roller 12 around which the tow travels.

Positioned beneath the tow travel path is a measuring apparatus 14 according to the present invention which measures tow tension. The apparatus 14 comprises a stationary framework 16 upon which a support plate 18 is fixedly supported. Carried by the plate 18 are a pair of bearing blocks 20 which rotatably support the ends of a pivot shaft 22 (FIG. 2). Affixed to the longitudinal midpoint of the pivot shaft 22 is a crank arm 24 which is pivotably connected by a pin 25 to the rod end 26 of a fluid ram 28. The cylinder end 30 of the ram 28 is pivotably connected by a pin 32 to a bracket 34 which is affixed to the framework 16. Thus, extension and retraction of the ram 28 produces rotation of the pivot shaft 22.

Figure 5:
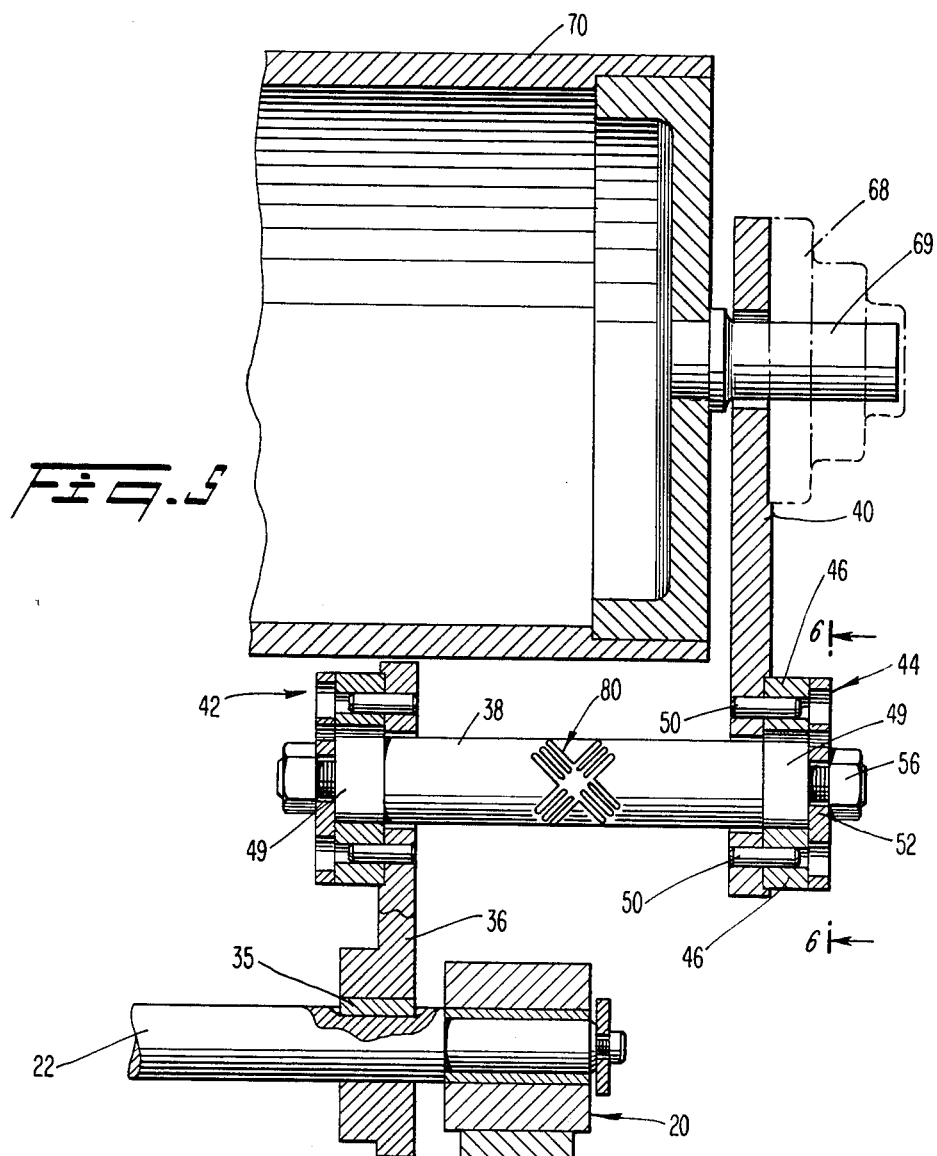
FIG. 5 is a fragmentary sectional view taken along a vertical plane oriented parallel to the axis of the sensing roll and depicting one of the torsion arms.
Figure 6:
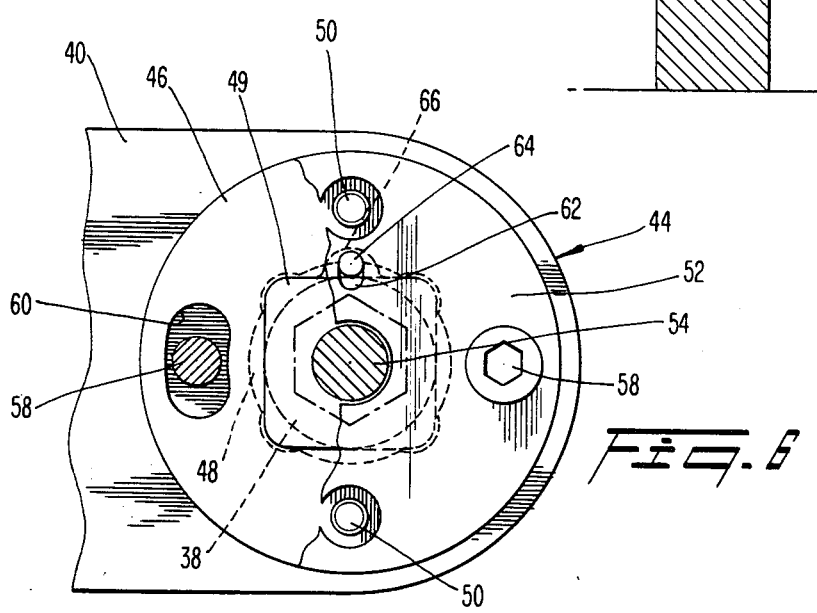
FIG. 6 is an enlarged view of a coupling between a torque arm and a torsion bar, and taken in the direction of line 6—6 in FIG. 5.

Affixed to the pivot shaft 22 by means of keys 35 for rotation therewith is a carrier comprising a pair of pivot arms 36. The pivot arms are each of L-shape, i.e., in the shape of a right angle. Each pivot arm includes a first, generally vertical portion 36A (FIGS. 3, 4) extending upwardly from the pivot shaft 22, and a second, generally horizontal position 36B extending from the first portion 36A. The ends of the horizontal portions 36B are connected to inner ends of the pair of torsion bars 38. Outer ends of the torsion bars are affixed to a pair of torque arms 40. The inner and outer ends of the torsion bars 38 are connected to the pivot arms 36 and torque arms 40 by couplings 42, 44 which prevent relative rotation between the torsion bars 38 and those arms 36, 40. The couplings 42, 44 are identical, so only the coupling 44 at the torque arms 40 will be described in detail. The coupling 44 comprises a mounting plate 46 (FIGS. 5, 6) which has a central, generally rectangular recess 48 within which is disposed a rectangular end portion 49 of the torsion bar 38. A pair of dowel pins 50 connects the mounting plate 46 to the torque arm 40.

Connected to the mounting plate 46 is an end plate 52 which has a center hole through which a threaded stub 54 of the torsion bar projects. A nut 56 is threadedly connected to the stub to secure the end plate 52 against the mounting plate 46. A pair of mounting bolts 58 extend through the end plate 52 and through slots 60 in the mounting plate and through the torque arm. Formed in the end plate 52 is a slot 62 through which a dowel pin 64 extends. The pins extend into a recess 66 formed in the mounting plate 46.

The torque arms 40 each include first and second sections 40A, 40B which are mutually perpendicularly angled. The first section 40A is oriented parallel to the second portion 36B of the pivot arm and extends generally horizontally from the outer end of the latter toward the first portion 36A. The second section 40B of each torque arm 40 extends perpendicularly from the outer end of the first section 40B in a direction away from the pivot shaft 22. Outer ends of the second sections 40B carry rotary bearings 68 which bearings 68 rotatably mount the axles 69 of a sensing roll 70. Thus, the sensing roll is freely rotatable to the torque arms 40.

Figure 3:
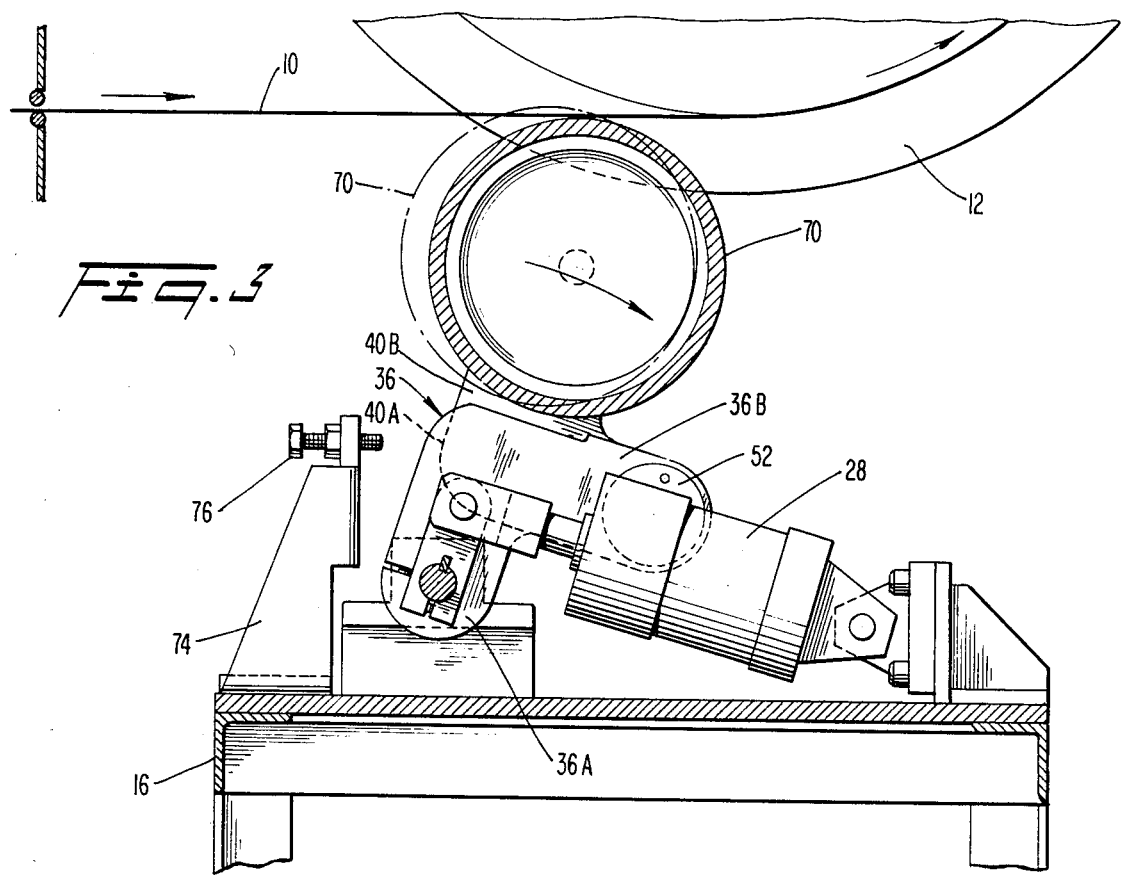
FIGS. 3 and 4 are vertical cross-sectional views taken through the apparatus of FIG. 2 along a plane oriented perpendicular to the axis of the sensing roll, FIG. 3 depicting the measuring apparatus in an inoperative state, and FIG. 4 depicting the apparatus in an operative state.
Figure 4:
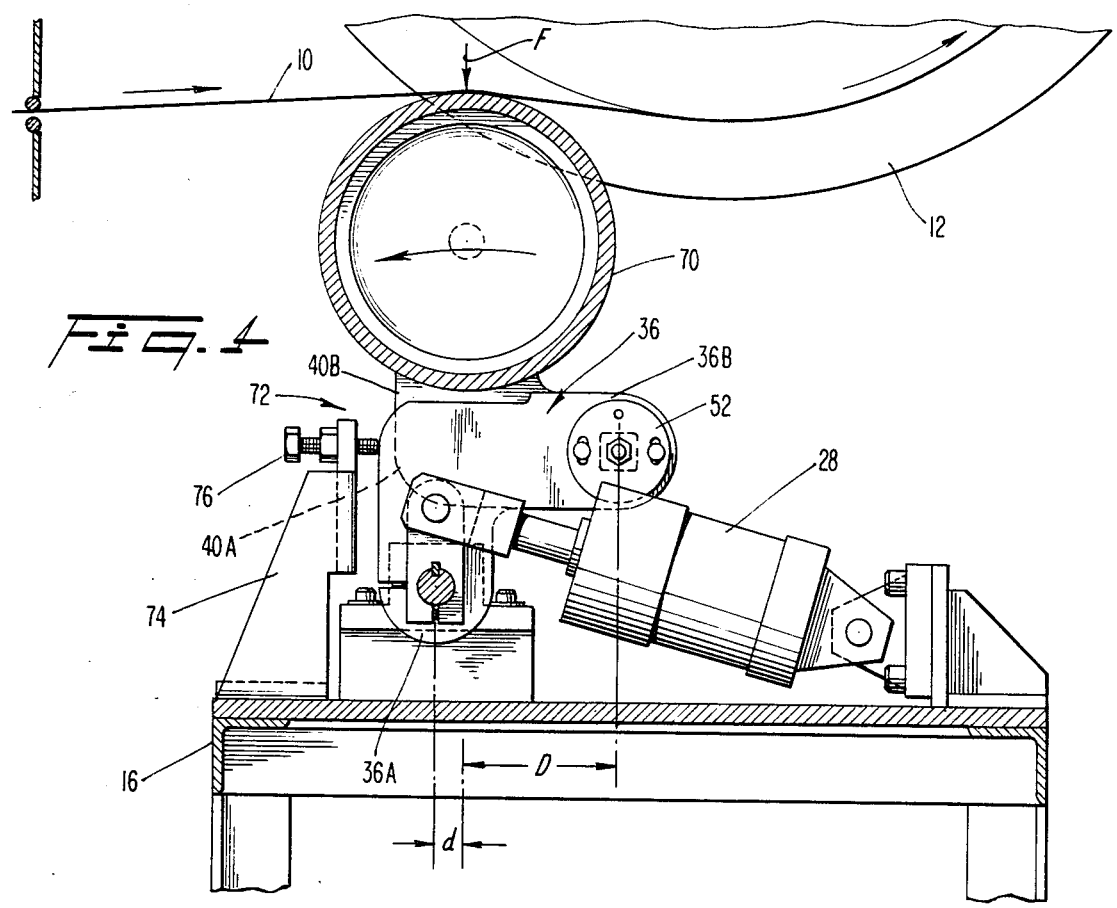

It will be appreciated that rotation of the pivot shaft 22 produces rotation of the pivot arms 36 and a corresponding raising or lowering of the sensing roll 70, as depicted in FIGS. 3, 4. The apparatus is positioned so that when the sensing roll 70 is in a downward position, the tow 10 is able to assume a straight path of travel (FIG. 3). When the sensing roll is raised, it displaces the tow 10 upwardly from such straight path (FIG. 4). In order to locate the sensing roll in its tow-displacing position, an adjustable stop device 72 is provided. The stop device 72 comprises a pair of rigid flanges 74 mounted on the framework 16, and stop screws 76 adjustably mounted therein. The ends of the stop screws 76 can be disposed within the path of travel of the pivot arms to terminate pivotal movement thereof as depicted in FIG. 4. The stop screws 76 can also be used to align the sensing roll so that the axis of the roll is horizontal and perpendicular to the direction of tow travel as viewed from above. This minimizes any tendency for the tow from wandering from side to side upon the roll.

Secured to each torsion bar 38 is a set of four strain gages 80, 80A which are of a standard type, e.g., EA-06-125TR-350 available from Micro-Measurements, Measurements Group, Raleigh, N.C., and are connected in a Wheatstone Bridge in conventional fashion to provide a precise measurement of torsional deformation of each of the torsion bars. Possible circuits in which strain gages can be connected to achieve such measurements are set forth in a paper entitled "Strain Gage Techniques" and presented at the Department of Engineering, University of California at Los Angeles, Aug. 18–29, 1958 by W. M. Murray and P. K. Stein. One possible circuit is depicted in FIG. 7 wherein signals from the strain gage bridges 80, 80A are fed to amplifiers 90, 90A and then to a summer 92. The combined signal is then fed to a high frequency filter 94 which removes high frequency "noise" caused by mechanical vibration or stray pickup including AC pickup, for example. The filtered signal is transmitted to a suitable indicator or recorder.

In operation, the ram 28 is actuated to raise the sensing roll 70 into engagement with a traveling tow to deflect the latter upwardly. The pivot arms 36 engage the stop screws 76 to precisely locate the sensing roll in its upper position. As this is done, the tow, which is under tension, applies a reaction force against the sensing roll 70 to produce a torsional deformation of the torsion bars. The amount of such deformation is measured by the strain gages.

It will be appreciated that since deformation of both torsion bars is being measured, the apparatus is insensitive to the location of the tow along the sensing roll 70. That is, as the tow shifts away from one end of the roll and toward the opposite end, the torsion bar associated with such one end will deform less, while the deformation of the torsion bar associated with such opposite end will increase. Thus, when the deformations are combined electrically, there will be no net decrease in sensed deformation produced by the tow shifting.

Furthermore, the apparatus is highly compact in configuration. Due to the arrangement wherein the pivot arms include second portions 36B which extend in generally transversely relative to the direction of the force F imposed upon the sensing roll 70, and the torque arms include first sections 40A which also extend transversely relative to such force F but in the opposite direction, an arrangement is achieved wherein a relatively long moment arm D for the torsion bars 38 is achieved, even though the center of the sensing roll 70 is offset by only a slight distance d from the pivot shaft 22 (see FIG. 4).

In addition, the actuating ram 28 is arranged such that its rod end, i.e., the non-anchored end, is straddled by the second portions 36B of the pivot arms 36 and thus a vertical and horizontal overlapping relationship exists between the ram 28 and those second portions 36B.

Since a pair of short torsion bars are employed, rather than a single, long torsion bar, the tendency for the bars to deform under the weight of the sensing roll is minimized. That renders the present invention to be highly suitable in connection with jumbo drawframes which employ strong, heavy sensing rolls.

Due to its compact nature, the apparatus can be employed in association with drawframes having a minimum of free space. This makes the apparatus ideally suitable as a retrofit unit for existing drawframes.

Although the present invention has been described in connection with a preferred embodiment thereof, it will be appreciated by those skilled in the art that additions, modifications, substitutions, and deletions not specifically described, may be made without departing from the spirit and scope of the invention as defined in the appended claims.

What is claimed is:

1. In a tension measuring apparatus for the measuring of tension in an elongate member which is being advanced under tension, said apparatus being of the type comprising sensor support means carrying a rotatable sensing roll, actuating means for moving said support means to bring said sensing roll into engagement with said elongate member such that said elongate member applies a reaction force against said sensing roll, torsion bar means operably connected to said sensing roll to be torsionally deformed thereby in response to the application of said reaction force against said sensing roll, and strain gages disposed on said torsion bar means to measure the extent of torsional deformation thereof, the improvement wherein said sensor support means comprises:

carrier means supported so as to be moved by said actuating means, said carrier means including a pair of arm portions spaced apart in a direction parallel to an axis of rotation of said sensing roll, said arm portions having inner ends and sections extending from said inner ends transversely relative to the direction of said reaction force;

said torsion bar means being fixedly connected to outer ends of said arm portions and extending therefrom generally parallel to said axis of rotation of said sensing roll;

a pair of torque members including sections having inner ends fixedly connected to said torsion bar means and extending therefrom generally parallel to said arm portions toward said inner ends of the latter, said sensing roll being carried by outer ends of said torque members;

said torque members defining moment arms for applying a torquing force to said torsion bar means in response to the application of said reaction force to said sensing roll, whereby said torsion bars are torsionally deformed and the extent of such deformation is sensed by said strain gages.

2. In an apparatus according to claim 1, wherein said carrier means comprises a pair of pivot arms pivotably connected at inner ends thereof for rotation about a common pivot axis extending generally parallel to said axis of rotation of said sensor roll, said pivot arms including first portions extending from said pivot axis and toward the elongate member being sensed, and second portions angled relative to said first portions and constituting said arm portions.

3. In an apparatus according to claim 2, wherein said second portions extend perpendicularly relative to said first portions.

4. In an apparatus according to claim 2, wherein said pivot axis and said axis of rotation are oriented horizontally.

5. In an apparatus according to claim 2 including a pivot shaft defining said pivot axis, said inner ends of said pivot arms fixedly connected to said pivot shaft, said actuator means comprises an extendible, retractible fluid ram having one end pivotably supported and its other end connected to said pivot shaft to produce rotation thereof, said arms arranged in straddling relationship to said other end of said ram.

6. In an apparatus according to claim 2 including stop means for stopping movement of said pivot arms when said sensor drum has been brought into a selected engagement with the elongate member.

7. In an apparatus according to claim 4, wherein the horizontal spacing between said pivot axis and said axis of rotation is less than the horizontal spacing between said axis of rotation and said torsion bar means.

8. In an apparatus according to claim 1, wherein said torsion bar means comprises a pair of separate torsion bars, each torsion bar being fixedly connected between one of said arm sections and one of said torque members.

9. In an apparatus according to claim 2, wherein said torque members each include first and second mutually angled sections, said first sections being fixedly connected to said torsion bar means and said second sections extending from outer ends of said first sections in a direction away from said pivot axis, said sensor roll being carried at outer ends of said second sections.

10. In a tension measuring apparatus for measuring the tension in an elongate member which is being advanced under tension, said apparatus being of the type comprising sensor support means carrying a rotatable sensing roll, actuating means for moving said sensor support means to bring said sensing roll into engagement with said elongate member such that said elongate member applies a reaction force against said sensing roll, torsion bar means operably connected to said sensing roll to be torsionally deformed thereby in response to the application of said reaction force against said sensing roll, and strain gages disposed on said torsion bar means to measure the extent of torsional deformation thereof, the improvement wherein said sensor support means comprises:

carrier means including a portion having an inner end and a section extending from said inner end in a direction generally transversely relative to the direction of said reaction force and including an outer end;

said torsion bar means comprising a pair of torsion bars mounted to said outer end of said portion of said carrier means and being spaced from one another in mutual alignment and extending generally parallel to an axis of rotation of said sensing roll; and a pair of torque members having inner ends connected to respective ones of said torsion bars and including sections extending therefrom generally parallel to said portion of said carrier means and toward said inner end of said portion, said sensing roll being carried by outer ends of said torque members, said torque members defining moment arms for applying a torquing force to said torsion bars in response to the application of said reaction force against said sensing roll, whereby said torsion bars are torsionally deformed and the extent of such deformation is sensed by said strain gages.

11. A tension measuring apparatus for measuring the tension in an elongate member, such as a tow band which is being advanced under tension, said apparatus comprising:

a support;

a pivot shaft mounted to said support for rotation about a pivot axis;

a pair of axially spaced pivot arms affixed to said pivot shaft for rotation therewith, said pivot arms each including:
- a first portion having an inner end extending from said pivot shaft, and
- a second portion extending at an angle from an outer end of said first portion;

an extensible-retractible fluid ram having a first end pivotably mounted to said support, and a second end connected to said pivot shaft intermediate said pivot arms for rotating said shaft, said ram being disposed on the same side of said pivot shaft as said second portions of said pivot arms whereby said second portions of said pivot arms are moved selectively toward and away from said ram when said ram is actuated, and said second portions of said pivot arms are moved into straddling relationship with a portion of said ram when moved toward said ram;

a pair of torsion bars having inner ends fixedly connected to outer ends of said second portions of said pivot arms and oriented generally parallel to said pivot shaft;

a pair of torque arms each including first and second mutually angled sections, said first sections being fixedly connected to outer ends of said torsion bars and extending generally parallel to said second portions toward said first portions, said second sections extending from outer ends of said first sections in a direction away from said pivot shaft;

a sensing roll rotatably carried by outer ends of said second sections and being movable into and from engagement with an elongate member being conducted under tension whereby said torsion bars are torsionally deformed in response to a reaction force being applied to said sensing roll by the elongate member; and strain gages on said torsion bars for sensing the amount of torsional deflection thereof.

* * * * *